(12) United States Patent
Lee

(10) Patent No.: US 7,295,841 B2
(45) Date of Patent: Nov. 13, 2007

(54) SYSTEM AND METHOD FOR PROVIDING EXHIBITION INFORMATION SERVICE THROUGH WIRELESS COMMUNICATION

(75) Inventor: Yoon-Jick Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 09/973,045

(22) Filed: Oct. 10, 2001

(65) Prior Publication Data
US 2002/0094812 A1    Jul. 18, 2002

(30) Foreign Application Priority Data
Jan. 5, 2001    (KR) .................................. 2001-578

(51) Int. Cl.
*H04Q 7/20* (2006.01)
(52) U.S. Cl. .................................. 455/435.1; 455/433
(58) Field of Classification Search ............ 455/435.1, 455/435.2, 412.1, 412.2, 414.2, 414.3, 526, 455/403, 414.1, 436–439, 445, 456.3, 456.5, 455/433; 709/218–219, 225, 203, 214, 314; 340/825.69, 825.72; 342/357.09, 357.1
See application file for complete search history.

(56) References Cited

U.S. PATENT DOCUMENTS

| | | | |
|---|---|---|---|
| 5,598,572 A | | 1/1997 | Tanikoshi et al. |
| 5,796,351 A | * | 8/1998 | Yabuki ................... 340/825.69 |
| 5,926,116 A | * | 7/1999 | Kitano et al. ................ 340/988 |
| 5,929,848 A | * | 7/1999 | Albukerk et al. ............ 455/526 |
| 5,966,658 A | | 10/1999 | Kennedy, III et al. |
| 6,088,648 A | * | 7/2000 | Shah et al. .................. 701/117 |
| 6,138,158 A | * | 10/2000 | Boyle et al. ................. 709/225 |
| 6,167,253 A | * | 12/2000 | Farris et al. ............. 455/412.2 |
| 6,343,317 B1 | * | 1/2002 | Glorikian .................... 709/218 |
| 6,434,479 B1 | * | 8/2002 | Kondou et al. ............. 701/203 |

(Continued)

FOREIGN PATENT DOCUMENTS

EP        0 853 287 A2    7/1998

(Continued)

OTHER PUBLICATIONS

Albrecht M. et al.; "IP Services Over Bluetooth: Leading the way to a New Mobility"; Proceedings Annual Conference on Local Computer Networks. LCN, XX, XX, Oct. 1999, pp. 2-11, XP002939431.

(Continued)

*Primary Examiner*—CongVan Tran
(74) *Attorney, Agent, or Firm*—Sughrue Mion Pllc.

(57) ABSTRACT

The present invention discloses a system and method for providing an exhibition information service through wireless communication. In the system for providing the exhibition information corresponding to a request signal, when wireless connection devices receive a signal from a wireless terminal for transmitting or receiving data through air, the wireless connection devices output information corresponding to the received data through a network, and transmit information corresponding to the data input through the network to the wireless terminal through air. In addition, an exhibition information server processes the exhibition information service corresponding to the data input through the network. As a result, the user can read the exhibition information for the exhibits at a particular time by using the wireless terminal, even when he/she is moving.

21 Claims, 9 Drawing Sheets

U.S. PATENT DOCUMENTS

| | | | |
|---|---|---|---|
| 6,477,542 B1 * | 11/2002 | Papaioannou | 707/104.1 |
| 6,501,956 B1 * | 12/2002 | Weeren et al. | 455/463 |
| 6,600,930 B1 * | 7/2003 | Sakurai et al. | 455/414.3 |
| 6,609,005 B1 * | 8/2003 | Chern | 455/457 |
| 6,677,894 B2 * | 1/2004 | Sheynblat et al. | 342/357.1 |
| 6,690,918 B2 * | 2/2004 | Evans et al. | 455/41.2 |
| 6,804,537 B1 * | 10/2004 | Fujii | 455/557 |
| 2001/0041553 A1 * | 11/2001 | Chang et al. | 455/406 |

FOREIGN PATENT DOCUMENTS

| | | |
|---|---|---|
| EP | 0 992 921 A2 | 4/2000 |
| EP | 1 008 946 A1 | 6/2000 |
| JP | 10-304433 | 11/1998 |
| JP | 11-055726 | 2/1999 |
| JP | 11-252121 A | 9/1999 |

OTHER PUBLICATIONS

"Specification of the Bluetooth System; Wireless connections made easy; Core; v1.0B", Bluetooth Specification Version, XX, XX, vol. 1, pp. 1, 95-126, 495-516; XP002174904, Jan. 12, 1999.

Fujino N et al.; "Mobile Information Service Based on Multi-Agent Architecture" IEICE Transactions on Communications, Institute of Electronics Information and Comm. Eng. Tokyo, JP, vol. E80-B, Nr. 10 pp. 1401-1406; XP000734533, Oct. 1997.

* cited by examiner

FIG.1
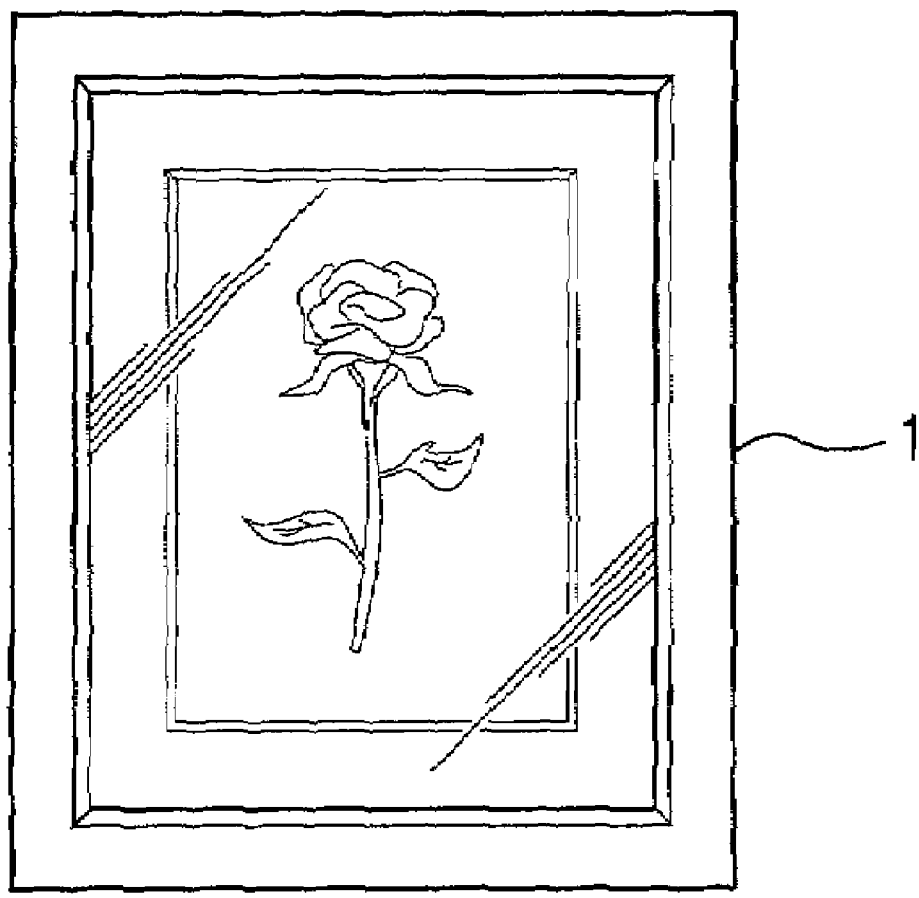

SYSTEM AND METHOD FOR PROVIDING EXHIBITION INFORMATION SERVICE THROUGH WIRELESS COMMUNICATION

BACKGROUND OF THE INVENTION

1. Field of the Invention

The present invention relates to an exhibition information service, and, in particular, to a system and method for providing an exhibition information service through wireless communication. The present application is based on Korean Patent Application No. 2001-578, which is incorporated herein by reference.

2. Description of the Related Art

In general, art objects are on exhibit in a gallery.

When intending to appreciate the art objects, spectators visit the gallery and obtain exhibition information through an information plate provided.

FIG. 1 shows a general information plate where the exhibition information is recorded.

Referring to FIG. 1, the information on an art object 1 is recorded on the information plate 2.

However, the information plate 2 is small, thus providing restricted information.

In addition, when a number of spectators appreciate a specific art object in the gallery, the spectators who remotely appreciate the art object cannot read the information on the information plate 2.

On the other hand, when intending to appreciate the art objects through the internet, the spectators can read the exhibition information in a specific place where a computer (not shown), an internet communication system (not shown) and an internet service network (not shown) are built. In addition, while appreciating the art objects in the gallery, the spectators are not able to read the exhibition information through the internet.

SUMMARY OF THE INVENTION

Accordingly, an object of the present invention is to provide a system and method for providing an exhibition information service through wireless communication which can enable users to appreciate wanted art objects, regardless of their location, and can enable users to read exhibition information even when they are moving.

In order to achieve the above-described object of the present invention, there is provided a system for providing an exhibition information service through wireless communication, including: wireless connection devices for outputting information corresponding to a signal received from a wireless terminal through a network, and transmitting information corresponding to data input through the network to the wireless terminal through air; and an exhibition information server for processing the exhibition information service corresponding to the data input through the network.

There is also provided a method for providing an exhibition information service through wireless communication, including: a wireless connection step for outputting information corresponding to a signal received from a wireless terminal through a network, and transmitting information corresponding to data input through the network to the wireless terminal through air; and an exhibition information service step for providing exhibition information by processing the exhibition information service corresponding to the data input through the network.

According to the present invention, the users can read the exhibition information for all the art objects in a gallery at one time through a plurality of wireless terminals, even when they are moving.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 shows a general information plate of an art object on exhibit;

DETAILED DESCRIPTION OF THE PREFERRED EMBODIMENT

A system and method for providing an exhibition information service through wireless communication in accordance with the present invention will now be described in detail with reference to the accompanying drawings.

Figure 2:
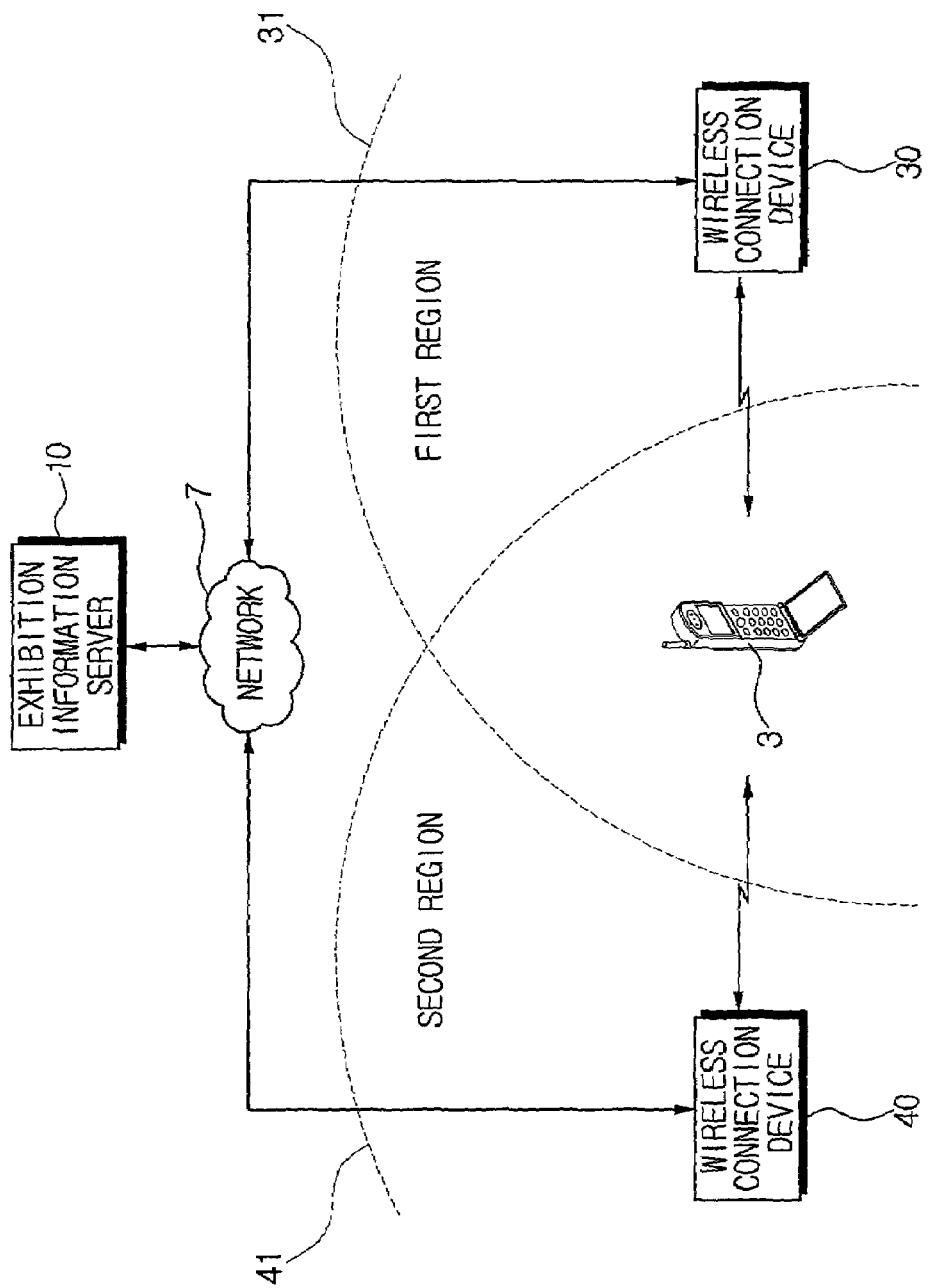
FIG. 2 is a block diagram illustrating a system for providing an exhibition information service through wireless communication in accordance with the present invention.

FIG. 2 is a block diagram illustrating the system for providing the exhibition information service through the wireless communication in accordance with the present invention.

As illustrated in FIG. 2, the system for providing the exhibition information service includes: an exhibition information server 10 for providing information corresponding to an exhibition information request signal; and wireless connection devices 30, 40 for transmitting or receiving data between a wireless terminal 3 and the exhibition information server 10.

Here, the exhibition information server 10 processes the exhibition information service corresponding to the data input through a network 7.

When receiving a signal from the wireless terminal 3 for transmitting or receiving data through air, the wireless connection devices 30, 40 output information corresponding to the received signal to the exhibition information server 10 through the network 7. In addition, the wireless connection devices 30, 40 transmit information corresponding to the data input from the exhibition information server 10 through the network 7 to the wireless terminal 3 through air.

Preferably, the wireless connection devices 30, 40 and the wireless terminal 3 perform a Blue-tooth communication, which is one of the wireless communication methods.

For this, the wireless terminal 3 and the wireless connection devices 30, 40 include a Blue-tooth module (not shown) for supporting the Blue-tooth communication.

Blue-tooth communication allows wireless transmission of information such as a video data in 1 Mbps in a range of 10 to 100 m. Accordingly, Blue-tooth communication is suitable to transmit or receive data at close range through the wireless communication.

Blue-tooth devices for mutually performing the Blue-tooth communication are connected for the communication, by performing an operation such as an Inquiry, Inquiry Scan, Page and Page Scan. Here, the Blue-tooth devices are divided into a master device and a slave device. In the present invention, the wireless connection devices 30, 40 serve as the master devices, and the wireless terminal serves as the slave device.

The Inquiry is performed by the master device, for transmitting an operation frequency of the master device to the slave device.

The Inquiry Scan is performed by the slave device, for detecting the received frequency, and performing synchronization according to the detected frequency.

In the Page operation, the master device transmits a clock signal to the slave device, so that the slave device can respond to the operation clock of the master device.

In the Page Scan operation, the slave device detects the received clock signal, and performs synchronization according to the clock signal.

Hereinafter, a first region 31 and a second region 41 are set up according to whether the wireless connection devices 30, 40 can provide the service to the wireless terminal 3. Therefore, the first region wireless connection device 30 receives information for an art object in the first region 31 from the exhibition information server 10, and provides the exhibition information service to the wireless terminal 3 which is positioned in the first region 31. On the other hand, the second region wireless connection device 40 receives information for an art object in the second region 41 from the exhibition information server 10, and provides the exhibition information service to the wireless terminal 3 which is positioned in the second region 41.

In order to read the exhibition information for the art object in the second region 41, the wireless terminal 3 transmits the inquiry scan for requesting the connection to the respective wireless connection devices 30, 40 transmitting the inquiry. According to the transmitted information, the wireless connection devices 30, 40 respectively transmit the information from the wireless terminal 3 to the exhibition information server 10 through the network 7.

When the exhibition information server 10 receiving the information from the wireless terminal 3 transmits data to the first region wireless connection device 30 so that the first region wireless connection device 30 can be connected to the wireless terminal 3, the first region wireless connection device 30 transmits the connection setup data to the wireless terminal 3 through air.

Here, the first region wireless connection device 30 transmits the connection information from the wireless terminal 3 to the exhibition information server 10 through the network 7.

The exhibition information server 10 receiving the connection information transmits an initial screen data including an exhibition information selection menu for the art objects to the first region wireless connection device 30 through the network 7, so that the initial screen data can be transmitted to the wireless terminal 3.

The first region wireless connection device 30 transmits the initial screen data to the wireless terminal 3 through the network 7.

A selection signal for the art object which the user selects in the exhibition information selection menu displayed on a liquid crystal screen 3a by a display device (not shown) of the wireless terminal 3, is transmitted to the exhibition information server 10 through the first region wireless connection device 30.

The exhibition information server 10 receiving the selection signal confirms a position of the first region wireless connection device 30. If the exhibition information service for the selected art object can be provided, the exhibition information server 10 transmits the exhibition information of the selected art object to the wireless terminal 3 through the first region wireless connection device 30. Here, the user can store and edit the information received in the wireless terminal 3. If the user needs additional information on the selected art object, the wireless terminal 3 receives the additional exhibition information from the exhibition information server 10 through the first region wireless connection device 30.

On the other hand, the exhibition information server 10 can be built so that the information service for the art objects in the corresponding region can be provided through the corresponding wireless connection device.

When the exhibition information server 10 confirms the position of the first region wireless connection device 30, if the exhibition information service for the selected art object cannot be provided, the exhibition information server 10 transmits disconnection command data to the first region wireless connection device 30 through the network 7, so that the first region wireless connection device can be disconnected from the wireless terminal 3. According to the disconnection command data, the first region wireless connection device 30 is disconnected from the wireless terminal 3.

Thereafter, the exhibition information server 10 transmits connection setup command data to a wireless connection device that can provide the exhibition information service for the selected art object to the wireless terminal 3.

Here, when the wireless connection device for providing the service is the second region wireless connection device 40, the exhibition information server 10 transmits the data to the second region wireless connection device 40 so that the second region wireless connection device 40 can be connected to the wireless terminal 3. According to the connection setup command data, the second region wireless connection device 40 transmits the inquiry to the wireless terminal 3. The wireless terminal 3 transmits the inquiry scan to the second region wireless connection device 40. At this time, the second region wireless connection device 40 transmits the information from the wireless terminal 3 to the exhibition information server 10, sets up the connection to the wireless terminal 3, and transmits the connection information related to the wireless terminal 3 to the exhibition information server 10.

The exhibition information server 10 receiving the connection information transmits the exhibition information of the selected art object to the second region wireless connection device 40 through the network 7.

The second region wireless connection device 40 transmits the exhibition information of the selected art object to the wireless terminal 3 through the network 7. Here, the user can store and edit the information received in the wireless terminal 3. If the user needs additional information related to the selected art object, the wireless terminal 3 receives the additional exhibition information from the exhibition information server 10 through the second region wireless connection device 40.

Figure 3:
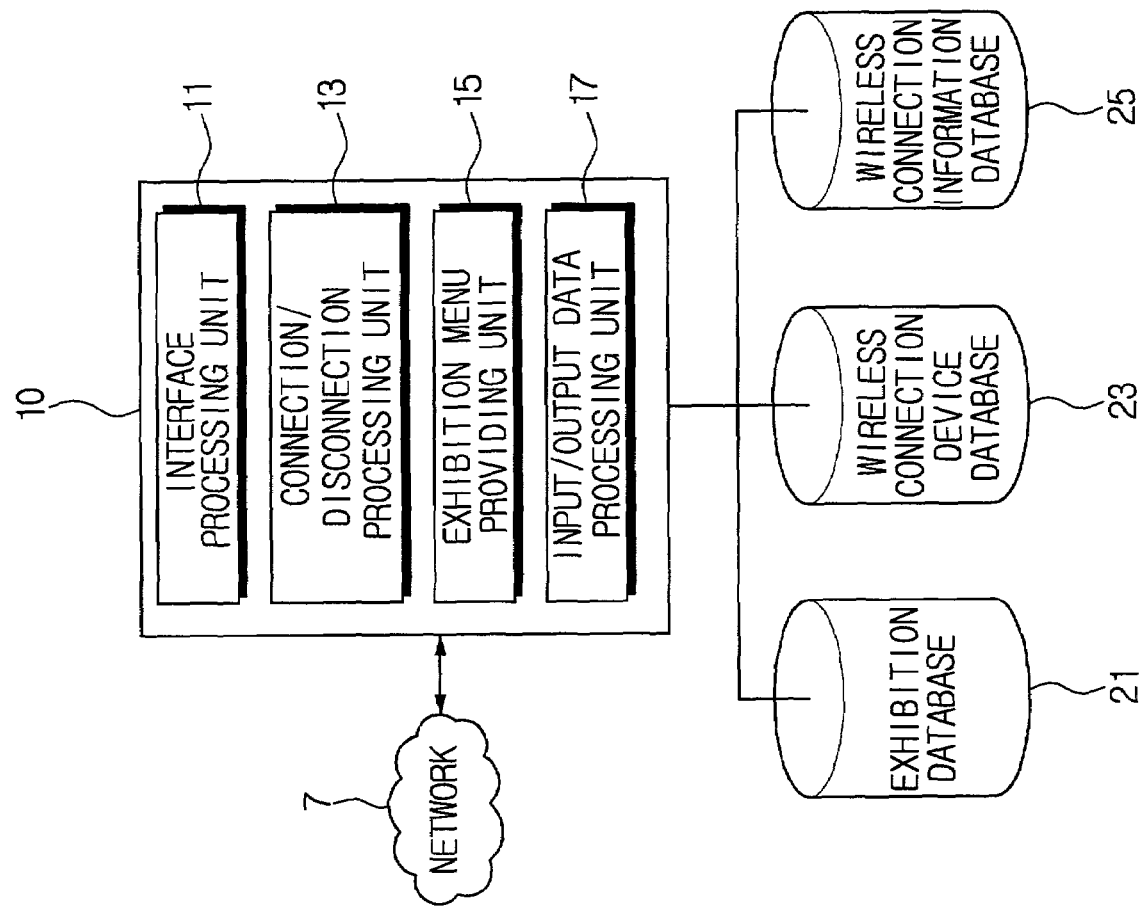
FIG. 3 is a block diagram illustrating a structure of an exhibition information server in FIG. 2.

FIG. 3 is a block diagram illustrating a structure of the exhibition information server 10 in FIG. 2.

As depicted in FIG. 3, the exhibition information server 10 includes an interface processing unit 11, a connection/disconnection processing unit 13, an exhibition menu providing unit 15, and an input/output data processing unit 17.

According to the information from the wireless terminal 3 output through the network 7, the interface processing unit 11 performs the communication between the wireless terminal 3 and the wireless connection devices 30, 40.

The connection/disconnection processing unit 13 enables the wireless connection devices 30, 40 to set up the connection or disconnection to/from the wireless terminal 3, according to the data transmitted from the exhibition information server 10 and processed in the interface processing unit 11.

When the connection setup is processed by the connection/disconnection processing unit 13, the exhibition menu providing unit 15 provides data including the exhibition information menu so that the wireless terminal 3 connected to the respective wireless connection devices 30, 40 through a channel on air can read the information for the art objects on exhibit.

The input/output data processing unit 17 receives the data from the respective wireless connection devices 30, 40, and outputs the information corresponding to the menu selection signal from the wireless terminal 3 according to the output data from the exhibition menu providing unit 15.

On the other hand, in order to smoothly provide the exhibition information service according to the input signal, the exhibition information server 10 preferably includes an exhibition database 21, a wireless connection device database 23, and a wireless connection information database 25.

The exhibition database 21 stores information related to the art objects on exhibit, in order to provide the exhibition information for the art objects.

The wireless connection device database 23 stores position information related to the wireless connection devices 30, 40 connected to the wireless terminal 3, and data on one of the art objects, which the wireless terminal 3 selects, in order to read exhibition information. The wireless connection information database 25 stores the information related to the wireless terminal 3 connected to the wireless connection devices 30, 40.

Figure 4:
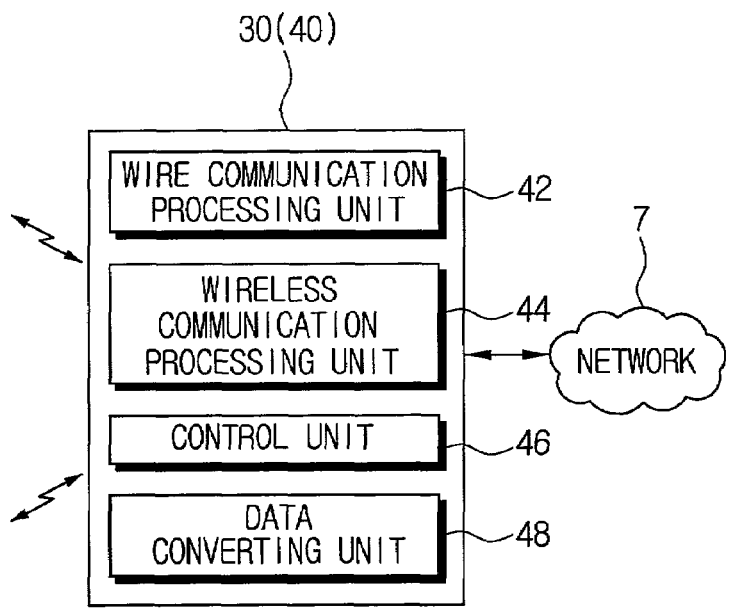
FIG. 4 is a block diagram illustrating a structure of a wireless connection device in FIG. 2.

FIG. 4 is a block diagram illustrating a structure of the wireless connection devices 30, 40 in FIG. 2.

As illustrated in FIG. 4, the respective wireless communication devices 30, 40 include a wire communication processing unit 42, a wireless communication processing unit 44, a control unit 46, and a data converting unit 48.

The wire communication processing unit 42 transmits the signal from the wireless terminal 3 to the exhibition information server 10 through the network 7, and receives the data from the exhibition information server 10 through the network 7.

The wireless communication processing unit 44 receives the signal from the wireless terminal 3 through air, and transmits the data through air according to the data transmission request signal output from the exhibition information server 10 through the network 7 and received in the wire communication processing unit 42.

When receiving the connection request signal from the wireless terminal 3, the control unit 46 sets up the desired conditions for the communication, such as an address for identification, and controls the respective units in order to communicate with the wireless terminal 3 according to the address.

The data converting unit 48 converts the signal from the wireless terminal 3 into data which can be transmitted through the network 7, and also converts the data from the exhibition information server 10 into data which can be transmitted through air.

Figure 5:
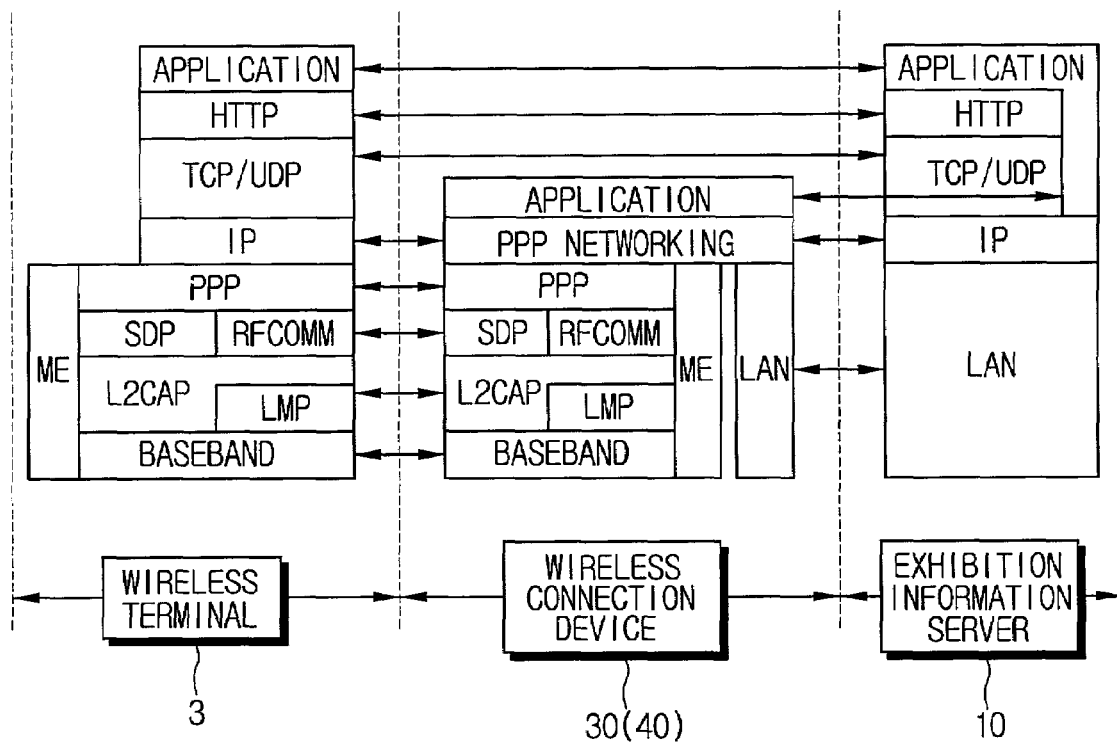
FIG. 5 is a block diagram illustrating exemplary protocol stacks in FIG. 2.

FIG. 5 is a block diagram illustrating exemplary protocol stacks of each unit in FIG. 2. Referring to FIG. 5, the exhibition information server 10 includes a local area network (LAN), an internet protocol (IP), a transmission control protocol/user data protocol (TCP/UDP), a hypertext transfer protocol (HTTP), and an application protocol.

Accordingly, the exhibition information server 10 includes the protocols for performing data transmission or reception through the network 7, and for providing the information corresponding to the request signal from the wireless terminal 3.

The wireless connection devices 30, 40 exchange data with the exhibition information server 10 through the LAN, point to point networking and application protocol. In addition, the wireless connection devices 30, 40 exchange data with the wireless terminal 3 through a baseband, a link manager protocol (LMP), a logical link control and adaptation protocol (L2CAP), a serial cable emulation protocol (RFCOMM), a service discovery protocol (SDP), a point to point protocol (PPP), and the point to point networking. Accordingly, the wireless connection devices 30, 40 transmit data between the exhibition information server 10 and the wireless terminal 3, and control the wireless terminal 3 to respond to the input data from the exhibition information server 10 according to the point to point networking and the application protocol.

The wireless terminal 3 includes the baseband, LMP, L2CAP, comment request, SDP, PPP, IP, TCP/UDP, HTTP and application protocol.

Therefore, the wireless terminal 3 transmits or receives data through the wireless connection devices 30, 40, and stores and edits the received data.

Figure 6:
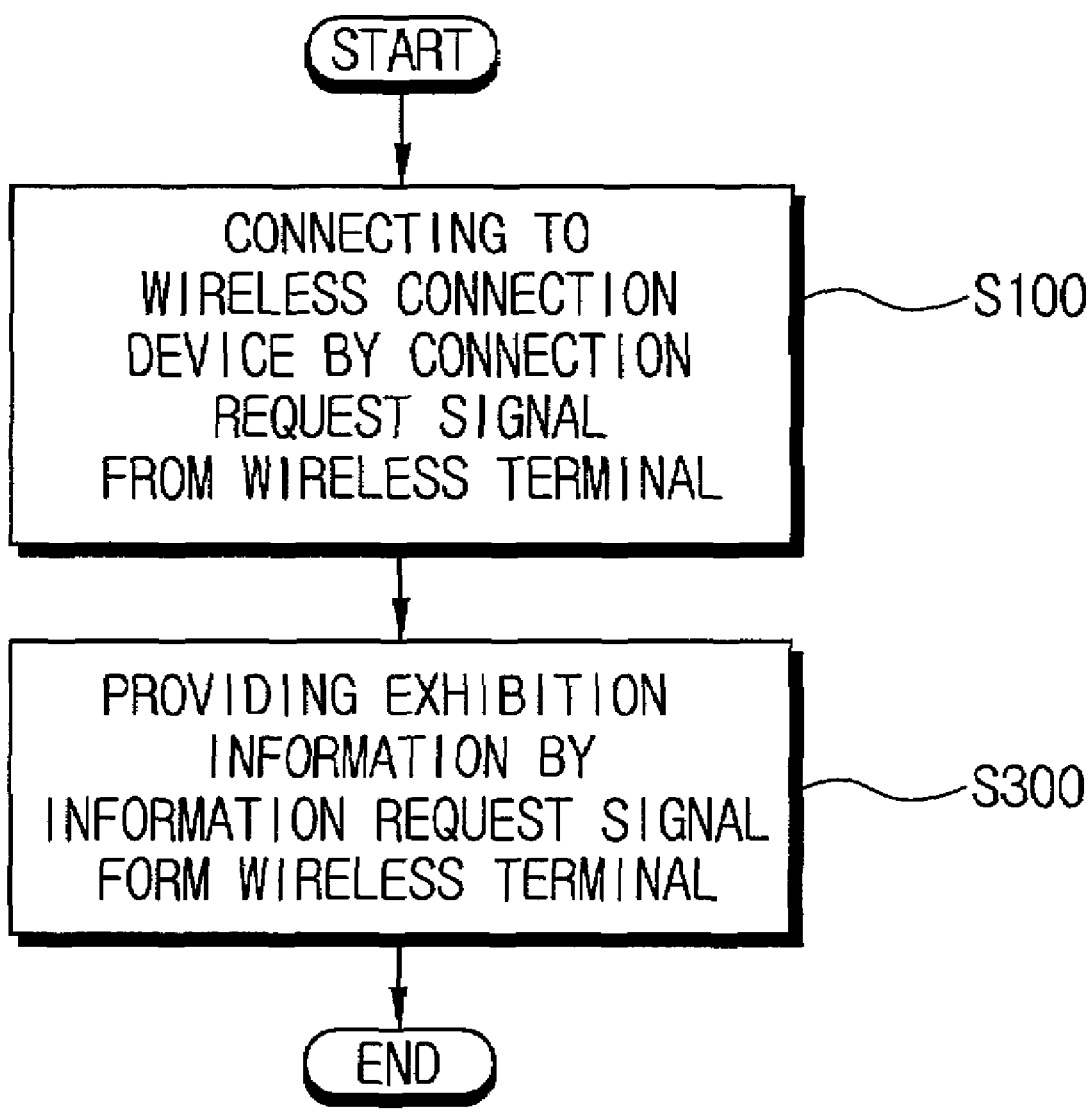
FIG. 6 is a flowchart showing a method for providing an exhibition information service through wireless communication in accordance with the present invention.

FIG. 6 is a flowchart showing the method for providing the exhibition information service through wireless communication in accordance with the present invention.

In a wireless connection step (S100), when the signal is received from the wireless terminal 3, the information corresponding to the received data is output through the network 7, and the information corresponding to the data input through the network 7 is transmitted to the wireless terminal 3. In an exhibition information service step (S300), the exhibition information is provided by processing the exhibition information service corresponding to the data input through the network 7.

Figure 7:
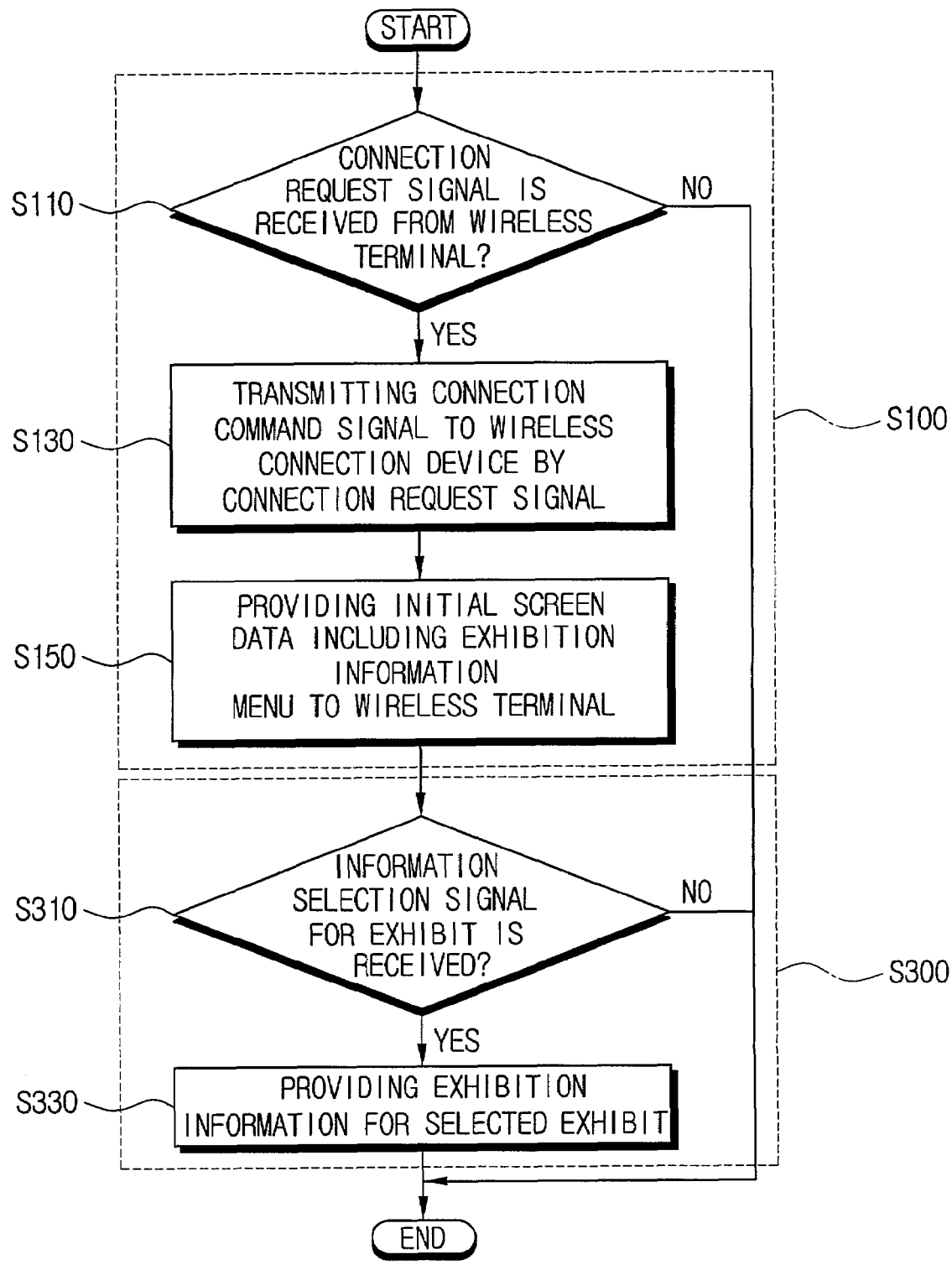
FIG. 7 is a detailed flowchart showing the method for providing the exhibition information service through wireless communication in FIG. 6.

FIG. 7 is a detailed flowchart showing the wireless connection step (S100) and the exhibition information service step (S300) in FIG. 6.

As shown in FIG. 7, the wireless connection step (S100) includes the steps of: judging whether the connection request signal is received from the wireless terminal (S110), transmitting the connection command signal between the wireless connection device 40 and the wireless terminal 3 according to the connection request signal (S130); and providing the initial screen data including the exhibition information menu to the wireless terminal 3 connected according to the connection command signal (S150).

The exhibition information service step (300) includes the steps of: judging whether the selection signal for the specific art object is received from the wireless terminal according to the initial screen data (S310); and providing the exhibition information on the art object corresponding to the selection signal(S330).

Here, the exhibition information includes explanations of the selected art object and information on the artist thereof.

In addition, the explanations of the art object preferably include at least one of genre, constitution, representation technique, production process, appreciation method and appreciation article.

Figure 8:
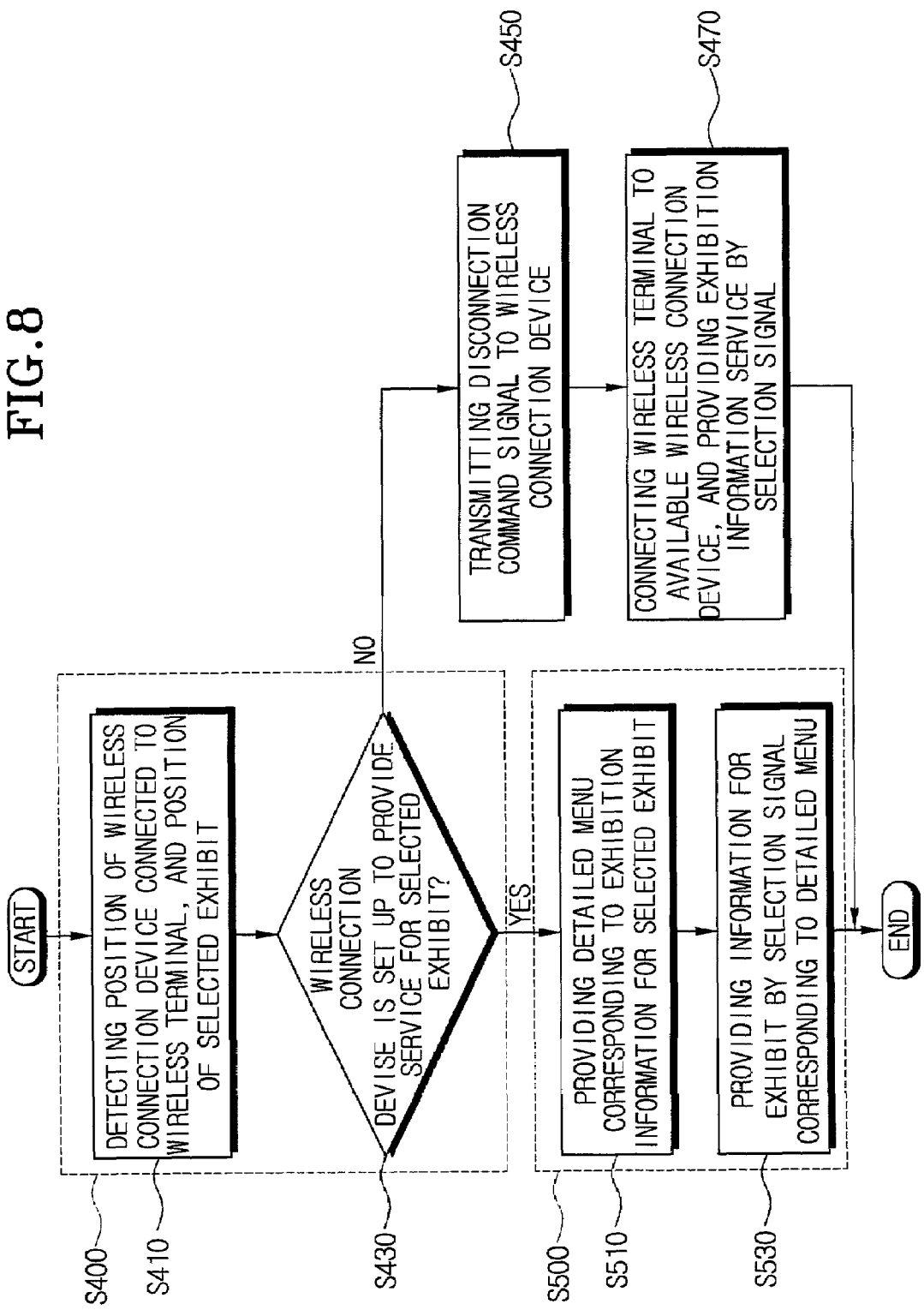
FIG. 8 is a detailed flowchart showing an exhibition information providing step for a selected art object in FIG. 7.

FIG. 8 is a detailed flowchart showing the exhibition information providing step for the selected art object in FIG. 7.

Referring to FIG. 8, the step for providing the exhibition information of the selected art object (S330) includes the steps of: confirming the connection state between the wireless terminal 3 and the wireless connection device 40 for providing the exhibition information service for the selected art object (S400); and providing the exhibition information of the selected art object according to the confirmed information (S500).

Here, the step for confirming the wireless connection device for providing the exhibition information service (S400) includes the steps of: detecting the position of the wireless connection device 40 connected to the wireless terminal 3, and the position of the art object selected by the wireless terminal 3 (S410); and judging whether the detected wireless connection device 40 is set up to provide the service for the selected art object to the wireless terminal 3 (S430).

The step for providing the exhibition information of the selected art object (S500) includes the steps of: providing the detailed menu corresponding to the exhibition information of the selected art object, when the service region wireless connection device 40 is set up to provide the service for the selected art object; and providing detailed information of the selected art object according to the selection signal of the detailed menu (S530).

On the other hand, when the detected wireless connection device 40 is not set up to provide the service for the selected art object in S430, there is further included a step for transmitting the disconnection command signal from the wireless terminal 3 to the wireless connection device 40 (S600); and a step for connecting the wireless terminal 3 disconnected from the wireless connection device 40 according to the disconnection command, to the wireless connection device that is set up to provide the service for the art object to the wireless terminal 3, and providing the exhibition information service for the selected art object (S610).

Figure 9:
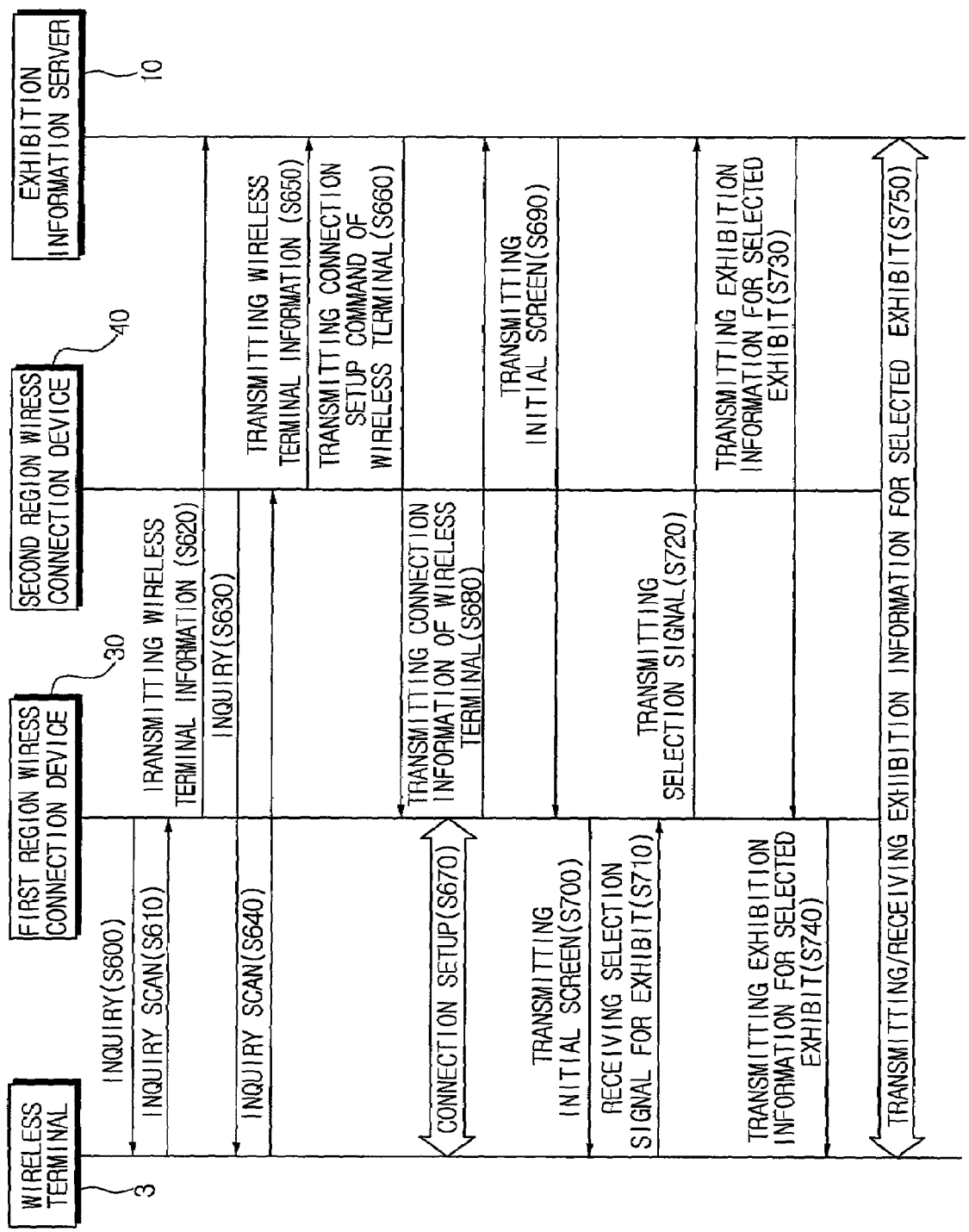
FIG. 9 is a flowchart showing the process for providing the service in FIG. 6.

FIG. 9 is a flowchart showing the operation process in FIG. 6.

As illustrated in FIG. 9, in order to read the exhibition information, the wireless terminal 3 transmits the inquiry scans (S610) (S640) for performing the frequency synchronization according to the inquiries (S600) (S630) to the respective wireless connection devices 30, 40. The wireless connection devices 30, 40 transmit the information for the wireless terminal 3 in the service region to the exhibition information server 10 (S620) (S650).

When the exhibition information server 10 transmits data to the first region wireless connection device 30 so that the first region wireless connection device 30 can be connected to the wireless terminal 3 (S660), the first region wireless connection device 30 is connected to the wireless terminal 3 according to the connection setup data (S670).

Here, the first region wireless connection device 30 transmits the connection information of the wireless terminal 3 to the exhibition information server 10 through the network 7 (S680).

The exhibition information server 10 transmits the initial screen data including the exhibition information selection menu for the art objects to the first region wireless connection device 30 through the network 7, so that the first region wireless connection device 30 can transmit the initial screen data to the wireless terminal 3 (S690).

The first region wireless connection device 30 transmits the initial screen data to the wireless terminal 3 through air (S700).

When the selection signal for the art object which the user selects in the exhibition information selection menu displayed on the screen of the wireless terminal 3 is transmitted to the first region wireless connection device 30 (S710), the first region wireless connection device 30 transmits the selection signal to the exhibition information server 10 through the network 7 (S720).

The exhibition information server 10 confirms the position of the first region wireless connection device 30. If the exhibition information service for the selected art object can be provided, the exhibition information server 10 transmits the exhibition information for the selected art object to the first region wireless connection device 30 (S730). The first region wireless connection device 30 transmits the received exhibition information to the wireless terminal 3 (S740). According to the additional information request signal for the selected art object, the wireless terminal 3 receives additional exhibition information from the exhibition information server 10 through the first region wireless connection device 30 (S750).

Figure 10:
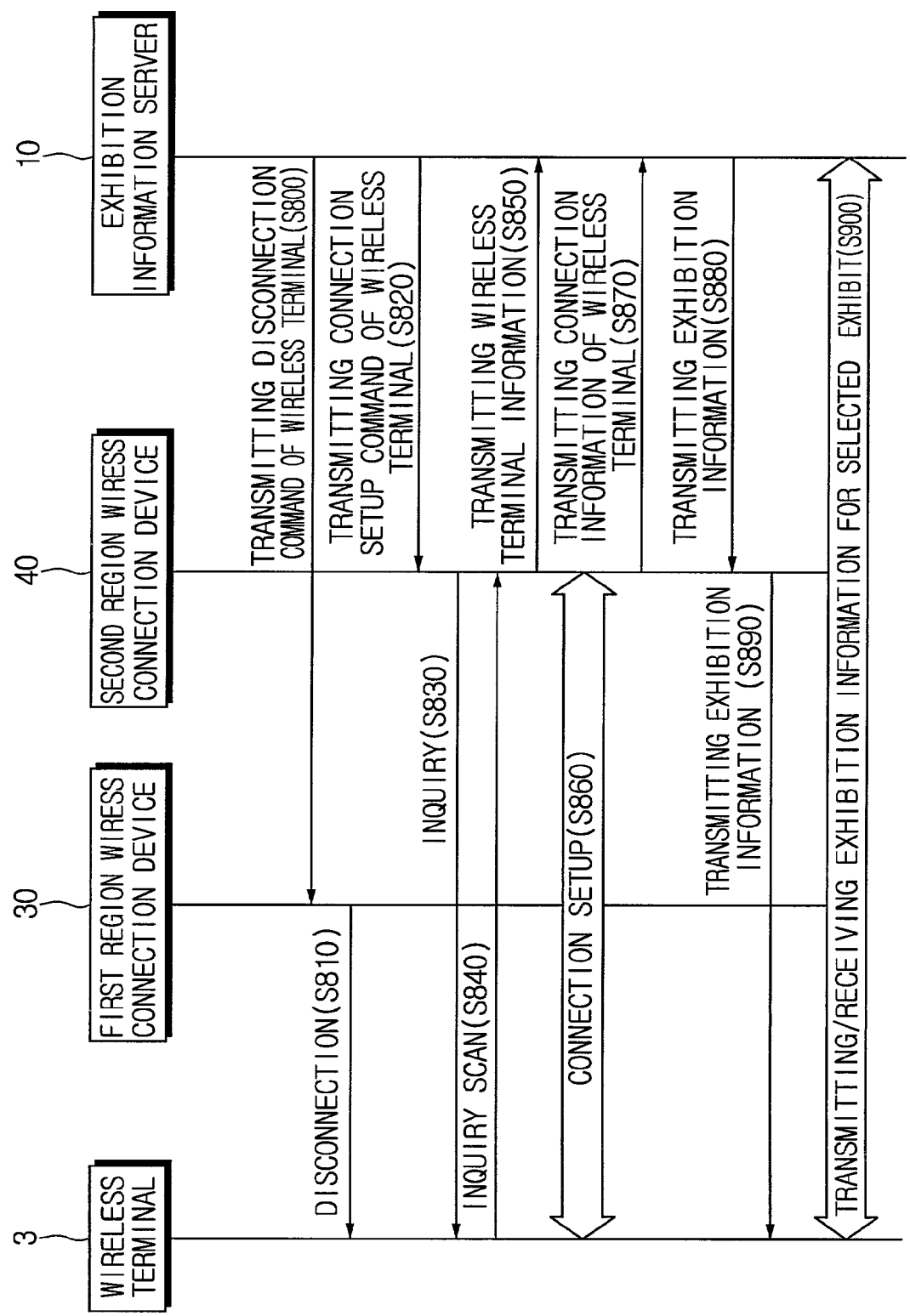
FIG. 10 is a flowchart showing the exhibition information service step by the exhibition information server in a state where the wireless connection device connected to the wireless terminal cannot provide the service in FIG. 6.

FIG. 10 is a flowchart showing the exhibition information service step by the exhibition information server in a state where the wireless connection device connected to the wireless terminal cannot provide the service in FIG. 6.

As depicted in FIG. 10, when the exhibition information server 10 confirms the position of the first region wireless connection device 30, if the exhibition information service for the selected art object cannot be provided, the exhibition information server 10 transmits disconnection command data to the first region wireless connection device 30 through the network 7, so that the first region wireless connection device can be disconnected from the wireless terminal 3 (S800). According to the disconnection command data, the first region wireless connection device 30 is disconnected from the wireless terminal 3 (S810).

Here, when the wireless connection device that can provide the service is the second region wireless connection device 40, the exhibition information server 10 transmits the connection setup command data to the second region wireless connection device 40 so that the second region wireless connection device 40 can be connected to the wireless terminal 3 (S820). According to the connection setup command data, the second region wireless connection device 40 transmits the inquiry to the wireless terminal 3 (S830). The wireless terminal 3 transmits the inquiry scan to the second region wireless connection device 40 (S840). At this time, the second region wireless connection device 40 transmits the information of the wireless terminal 3 to the exhibition information server 10 (S850), sets up the connection to the wireless terminal 3 (S860), and transmits the connection information related to the wireless terminal 3 to the exhibition information server 10 (S870).

The exhibition information server 10 transmits the exhibition information of the selected art object to the second region wireless connection device 40 through the network 7 (S880).

The second region wireless connection device 40 transmits the exhibition information of the selected art object to the wireless terminal 3 through the network 7 (S890). According to the additional information request signal for the selected art object, the wireless terminal 3 receives the additional exhibition information from the exhibition information server 10 through the second region wireless connection device 40(S900).

As described above, the art objects are exemplified in the present invention. However, the present invention can also be applied to various exhibits, such as home appliances, books, advertisement objects, and recording media in the same manner.

In addition, the present invention is not restricted to objects, but can be employed to provide an information service in a place of service. For example, the present invention is embodied in the same manner in the place where the information service is provided by using a special wireless connection device, such as book information of book stores, goods information in markets, and traffic information in roads.

In accordance with the present invention, the users can read the exhibition information related to the art objects at one time by using a plurality of wireless terminals, even when they are moving. In addition, the exhibition information is transmitted through the network or air in the form of data, and thus the users can correct and add the exhibition information received in the wireless terminals.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A system for providing an exhibition information service through wireless communication, comprising:
    wireless connection devices for preparing for connection to a wireless terminal in a service region, and outputting information related to an exhibition for the wireless terminal through a network; and
    an exhibition information server for processing the exhibition information service corresponding to the information related to the exhibition inputted through the network,
    wherein the connection is automatically initiated when the wireless terminal enters the service region.

2. The system according to claim 1, wherein the wireless connection devices each respectively comprise:
    a wire communication processing unit for transmitting the signal from the wireless terminal to the exhibition information server through the network, and receiving the data from the exhibition information server through the network; and
    a wireless communication processing unit for receiving the signal from the wireless terminal, and transmitting the data through air according to a data transmission request signal outputted from the exhibition information server through the network and received in the wire communication processing unit.

3. The system according to claim 2, wherein the wireless connection devices further comprise a control unit for setting up an address of the wireless terminal, for connecting and communicating with the wireless terminal, when receiving a connection request signal from the wireless terminal, and for controlling the connection or disconnection of the wireless terminal.

4. The system according to claim 3, wherein the wireless connection devices further comprise a data converting unit for converting a signal from the wireless terminal into a data which can be transmitted through the network, and also converting a data from the exhibition information server into a data which can be transmitted through air.

5. The system according to claim 1, wherein the exhibition information server comprises:
    an interface processing unit for smoothly performing the communication between the wireless terminal and the wireless connection device according to the information for the wireless terminal outputted through the network;
    a connection/disconnection processing unit for reading the data processed in the interface processing unit, and enabling the wireless connection devices to set up the connection or disconnection to/from the wireless terminal;
    an exhibition menu providing unit for providing a data including the exhibition information menu so that the wireless terminal connected to the wireless connection device can read the information for the exhibits, when the connection setup is processed by the connection/disconnection processing unit; and
    an input/output data processing unit for receiving the data from the wireless connection device, and outputting the information corresponding to the menu selection signal from the wireless terminal according to the output data from the exhibition menu providing unit.

6. The system according to claim 5, wherein the exhibition information server further comprises an exhibition database for storing information for the exhibits on exhibition in order to provide the exhibition information for the exhibits.

7. The system according to claim 6, wherein the exhibition information server further comprises a wireless connection device database for storing position information for the wireless connection device connected to the wireless terminal, and data for the exhibit which the wireless terminal selects to read the exhibition information.

8. The system according to claim 7, wherein the exhibition information server further comprises a wireless connection information database for storing the information for the wireless terminal connected to the wireless connection device.

9. A method for providing an exhibition information service through wireless communication, comprising:
    a wireless connection step for preparing for connection to a wireless terminal in a service region, and outputting information related to an exhibition for the wireless terminal through a network; and
    an exhibition information service step for processing the exhibition information service corresponding to the information inputted through the network,
    wherein the connection is automatically initiated when the wireless terminal enters the service region.

10. The method according to claim 9, wherein the wireless connection step comprises the steps of:
   judging whether a connection request signal is received from the wireless terminal;
   transmitting a connection command signal between a wireless connection device and the wireless terminal; and
   providing, from a device different from the wireless terminal, initial screen data including an exhibition information menu to the wireless terminal.

11. The method according to claim 10, wherein the exhibition information service step comprises the steps of:
   judging whether a selection signal for a specific exhibit is received from the wireless terminal according to the initial screen data; and
   providing the exhibition information for the exhibit corresponding to the selection signal.

12. The method according to claim 11, wherein, when the exhibition information relates to an art object, the exhibition information comprises explanations of the selected art object and information for the artist thereof.

13. The method according to claim 12, wherein the explanations of the art object comprise at least one of a genre, constitution, representation technique, production process, appreciation method and appreciation article.

14. The method according to claim 11, wherein the step for providing the exhibition information for the selected exhibit comprises the steps of:
   confirming the connection state between the wireless terminal and the wireless connection device for providing the service; and
   providing the exhibition information for the selected exhibit according to the confirmed information.

15. The method according to claim 14, wherein the step for confirming the wireless connection device for providing the service, comprises the steps of:
   detecting the position of the wireless connection device connected to the wireless terminal, and the position of the exhibit selected by the wireless terminal; and
   judging whether the detected wireless connection device is set up to provide the service for the selected exhibit to the wireless terminal.

16. The method according to claim 15, further comprising the steps of: transmitting a disconnection command signal from the wireless terminal to the wireless connection device, when the detected wireless connection device cannot provide the service; and
   connecting the wireless terminal disconnected from the wireless connection device according to the disconnection command to the wireless connection device set up to provide the service, and providing the exhibition information service according to the selection signal.

17. The method according to claim 14, wherein the step for providing the exhibition information for the selected exhibit comprises the steps of:
   providing a detailed menu corresponding to the exhibition information for the selected exhibit according to the selection signal; and
   providing detailed information for the selected exhibit according to the selection signal of the detailed menu.

18. A method for providing an exhibition information service through wireless communication, comprising the steps of:
   preparing for connection for wireless communication with a wireless terminal in a service region;
   wireless-connecting to the wireless terminal according to a connection signal; and
   transmitting an initial screen to provide the exhibition information service to the wireless terminal,
   wherein said connection for wireless communication is automatically initiated when the wireless terminal enters the service region.

19. The method according to claim 18, further comprising a step for providing the exhibition information service according to a selection signal of the initial screen from the wireless terminal.

20. A method for providing an exhibition information service through wireless communication, comprising the steps of:
   preparing for connection for wireless communication with a wireless connection device in a service region; and
   receiving an initial screen from the wireless connection device in order to read the exhibition information.

21. The method according to claim 20, further comprising the steps of:
   selecting the menu in the initial screen in order to request the service; and
   receiving information corresponding to the menu selected by the wireless terminal.

* * * * *